US011654783B2

(12) United States Patent
Takahashi et al.

(10) Patent No.: US 11,654,783 B2
(45) Date of Patent: May 23, 2023

(54) ELECTRIC LAWNMOWER WITH COIL FOR WIRELESS CHARGING AND DISCHARGING OF BATTERY PACK

(71) Applicant: HONDA MOTOR CO., LTD., Tokyo (JP)

(72) Inventors: Hiroya Takahashi, Wako (JP); Yoshiaki Kotani, Wako (JP); Takumi Shiiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 347 days.

(21) Appl. No.: 17/000,689

(22) Filed: Aug. 24, 2020

(65) Prior Publication Data
US 2021/0061109 A1    Mar. 4, 2021

(30) Foreign Application Priority Data
Sep. 4, 2019 (JP) .............................. JP2019-161062

(51) Int. Cl.
*B60L 50/64* (2019.01)
*H02J 50/12* (2016.01)
(Continued)

(52) U.S. Cl.
CPC .............. *B60L 50/64* (2019.02); *A01B 76/00* (2013.01); *A01D 34/001* (2013.01); *B60L 53/12* (2019.02);
(Continued)

(58) Field of Classification Search
CPC ........ B60L 50/64; B60L 53/12; H02J 7/0068; H02J 7/0047; A01B 76/00
(Continued)

(56) References Cited

U.S. PATENT DOCUMENTS 9,376,027 B2 * 6/2016 Harris ..................... H02J 50/90
11,161,422 B2 * 11/2021 Andriolo ................. H02J 50/10
(Continued)

FOREIGN PATENT DOCUMENTS

DE    10 2011 086 660         5/2012
DE       102011086660 A1 *   5/2012  .............. H02J 50/12
(Continued)

OTHER PUBLICATIONS

German Search Report and Examination Report dated Apr. 14, 2021, 6 pagess.

*Primary Examiner* — Richard V Muralidar
(74) *Attorney, Agent, or Firm* — Rankin, Hill & Clark LLP

(57) ABSTRACT

The invention includes a memory unit that stores electrical characteristics of a power receiving coil of an electric lawnmower and a power transfer coil of an external charger, wherein a battery side control circuit performs a test power transfer from a power transferring/receiving coil to the power receiving coil or the power transfer coil to obtain electrical characteristics of a power receiving side, compares the electrical characteristics to the electrical characteristics stored in the memory unit to determine whether the electrical characteristics are of a power transfer to the power receiving coil or of a power transfer to the power transfer coil, and performs control to switch to a power transfer mode with respect to the power receiving coil or to a power receiving mode with respect to the power transfer coil.

8 Claims, 6 Drawing Sheets

(51) Int. Cl.
*A01B 76/00* (2006.01)
*B60L 53/12* (2019.01)
*H02J 7/00* (2006.01)
*B60L 53/62* (2019.01)
*A01D 34/00* (2006.01)
*A01D 101/00* (2006.01)

(52) U.S. Cl.
CPC .......... *B60L 53/62* (2019.02); *H02J 7/00032* (2020.01); *H02J 7/0047* (2013.01); *H02J 7/0068* (2013.01); *H02J 50/12* (2016.02); *A01D 2101/00* (2013.01); *B60L 2200/40* (2013.01)

(58) Field of Classification Search
USPC .......................................... 320/104, 108, 112
See application file for complete search history.

(56) References Cited

U.S. PATENT DOCUMENTS

| | | | | |
|---|---|---|---|---|
| 11,490,566 | B2* | 11/2022 | Hasegawa | ............... A01D 34/78 |
| 2011/0084658 | A1* | 4/2011 | Yamamoto | ............... B60L 53/80 |
| | | | | 320/108 |
| 2019/0245389 | A1 | 8/2019 | Johnston et al. | |

FOREIGN PATENT DOCUMENTS

| DE | 20 2014 011 252 | 11/2018 |
|---|---|---|
| JP | 2017-135898 | 8/2017 |

* cited by examiner

ELECTRIC LAWNMOWER WITH COIL FOR WIRELESS CHARGING AND DISCHARGING OF BATTERY PACK

BACKGROUND OF THE INVENTION

Incorporation by Reference

The present application claims priority under 35 U.S.C. § 119 to Japanese Patent Application No. 2019-161062 filed on Sep. 4, 2019. The content of the application is incorporated herein by reference in its entirety.

FIELD OF THE INVENTION

The present invention relates to battery packs, and particularly relates to a battery pack that allows for supply of electric power by wireless power transfer.

Description of the Related Art

Conventionally, work machines such as, for example, lawn mowers, include an electric motor as a mechanical power source, and a battery that supplies electric power to the electric motor, and systems have been used wherein the battery is charged by connecting the work machine to a specific station.

However, since this kind of system adopts a construction in which a terminal of the battery and a charging terminal of an external charger are mechanically connected, an inrush current occurs when the battery is mounted or detached or instantaneous interruption (outage) in the connection part causes arcing to occur, which may cause fusing or roughening of the terminal, which in the worst case could make it impossible to mount the battery pack.

Moreover, with the terminal of the battery to be connected to the station exposed, it may be subject to corrosion, which could cause poor conduction.

Further, with the terminal of the battery exposed, there is a need for waterproofing the terminal, and there was a risk of damage to the terminal.

Therefore, conventional techniques have been disclosed wherein, for example, a power transfer device is installed in a station, a power receiving device is installed in a moving body that is movable relative to the station, a switch is provided on the power transfer side, the power receiving side, or to both the power transfer and the power receiving sides, the switch being turned on when the moving body is located within a range where power transfer from the station to the moving body is possible, wherein it is detected that no foreign objects equal to or bigger than a predetermined size are present between the station and the moving body before wireless power transfer is performed (see, for example, Patent Literature 1).

CITATION LIST

Patent Literature

Patent Literature 1: JP 2017-135898A

However, although conventional techniques allow for wireless power transfer to a battery, since there is a need to supply power to the work machine utilizing the battery, it is not possible to completely eliminate the terminal of the battery. There was therefore a risk of damage or corrosion of the terminal portion.

The present invention was made in view of the above point, and has an object of providing a battery pack in which there is no need for a terminal of the battery, and which allows for power to be supplied to the work machine from an external charger by wireless power transfer.

SUMMARY OF THE INVENTION

In order to achieve the above object, an aspect of the present invention is characterized in that it includes a battery pack that is to be installed in a work machine to supply power to the work machine by wireless power transfer, and includes a battery, a power transferring/receiving coil, and a control circuit that switches between a power transfer mode in which electrical current of the battery is transferred to a power receiving coil provided to the work machine and a power receiving mode in which power transferred from a power transfer coil provided to an external charger charges the battery.

The above configuration is characterized in that it includes a memory unit that stores electrical characteristics of the power receiving coil of the work machine and the power transfer coil of the external charger, wherein the control circuit performs a test power transfer from the power transferring/receiving coil to the power receiving coil or the power transfer coil to obtain electrical characteristics of a power receiving side, compares the electrical characteristics to the electrical characteristics stored in the memory unit to determine whether the electrical characteristics are of a power transfer to the power receiving coil or of a power transfer to the power transfer coil, and performs control to switch to the power transfer mode with respect to the power receiving coil or to the power receiving mode with respect to the power transfer coil.

The above configuration is characterized in that the control circuit, when an instruction has been received from an input means, performs control in a test mode to determine whether or not power has been supplied from the external charger to the power transferring/receiving coil, and in case power has been supplied from the external charger to the power transferring/receiving coil within a predetermined time period, the b control circuit switches to the power receiving mode, and in case power has not been supplied from the external charger within the predetermined time period, the control circuit performs a test power transfer, and switches to a transmission mode if the power receiving coil is determined to be present.

The above configuration is characterized in that it further includes a communication unit that is communicably connectable respectively to a communication unit provided to the work machine and a communication unit provided to the external charger, wherein the control circuit switches to the power receiving mode in case the communication unit is connected to the communication unit of the external charger, and switches to the power transfer mode in case the communication unit is connected to the communication unit of the work machine.

The above configuration is characterized in that the work machine has a construction of connecting mechanically to the external charger, and the input means performs an input operation when the work machine is connected to the external charger.

The above configuration is characterized in that the power transferring/receiving coil has a shape that fits with the power receiving coil or the power transfer coil.

The above configuration is characterized in that the battery pack is secured to the work machine at a predetermined position by a screw.

Advantageous Effects of the Invention

According to an aspect of the present invention, the control circuit can switch between a power transfer mode in which a current of the battery is transferred to the power receiving coil provided to the work machine and a power receiving mode in which the battery is charged with power transferred from the power transfer coil provided to the external charger, which allows for power supply from the battery pack to the work machine and power supply from the external charger to be performed wirelessly. As a result, there is no need whatsoever for an external terminal of the battery pack, which prevents damage, corrosion etc. from occurring in the terminal portion and allows for power supply by the battery pack and charging of the battery pack to be performed smoothly.

DETAILED DESCRIPTION OF THE PREFERRED EMBODIMENTS

The embodiments of the present invention are described below with reference to the drawings.

Figure 1:
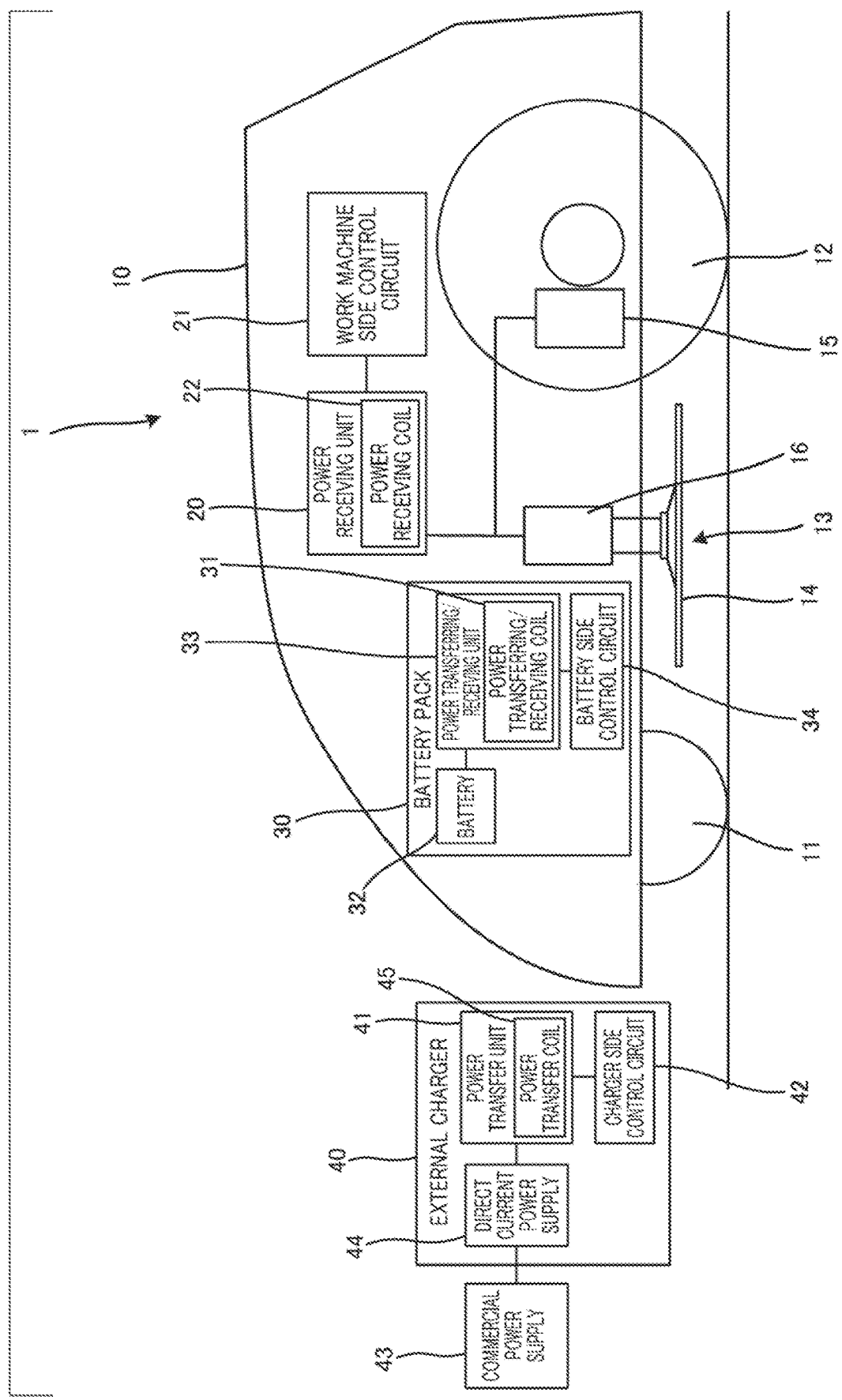
FIG. 1 is a schematic view showing a first embodiment wherein a battery pack according to the present invention is applied to a work machine.

FIG. 1 shows a schematic view of a work machine provided with a battery pack according to the present invention. In the present embodiment, an example wherein an electric lawnmower is applied as the work machine is described.

As shown in FIG. 1, an electric lawnmower 1 includes a housing 10 constituting a main body case, front wheels 11 provided respectively on the left and right of the front of the housing 10, rear wheels 12 provided respectively on the left and right of the rear of the housing 10, and an operating unit 13 provided on the bottom of the center of the housing 10. The operating unit 13 has a mowing blade disc 14 provided with a mowing blade for mowing grass.

The electric lawnmower 1 has a travel motor 15 that individually drives the left and right rear wheels 12, a work motor 16 that drives the mowing blade disc 14 of the operating unit 13, a power receiving unit 20, a work machine side control circuit 21, and a battery pack 30, which are housed within the housing 10.

Although not shown here, the battery pack 30 is secured to the housing 10 of the electric lawnmower 1 at a predetermined position using screws or the like. This allows for prevention of displacement of the battery pack 30.

The work machine side control circuit 21 controls each part of the electric lawnmower 1, and includes a processor such as a CPU or MPU, and a memory unit such as a RAM or ROM. By having the processor execute a program stored in the memory unit, the work machine side control circuit 21 functions as various control means, such as autonomous travel control in which the travel motor 15 is controlled for autonomous travel, and mowing operation control in which the work motor 16 is controlled to perform a mowing operation.

The power receiving unit 20 includes a power receiving coil 22 and a power receiving circuit (not shown).

The power receiving coil 22 is a power extracting coil which is magnetically coupled to a later described power transferring/receiving coil 31 of the battery pack 30 which generates an alternating magnetic field by an alternating current, and receives power by generating electromotive force through electromagnetic induction.

The power receiving circuit generates power from the electromotive force occurring in the power receiving coil 22. The power receiving circuit is a circuit that causes the power receiving coil 22 to resonate with the alternating magnetic field (alternating current) of the power transferring/receiving coil 31 to generate a sinusoidal current in the power receiving coil 22, rectifies the current to generate a direct current voltage, converts the direct current voltage to a direct current voltage with a predetermined voltage value, and supplies power to the parts of the electric lawnmower 1, such as the travel motor 15 and the work motor 16.

Figure 2:
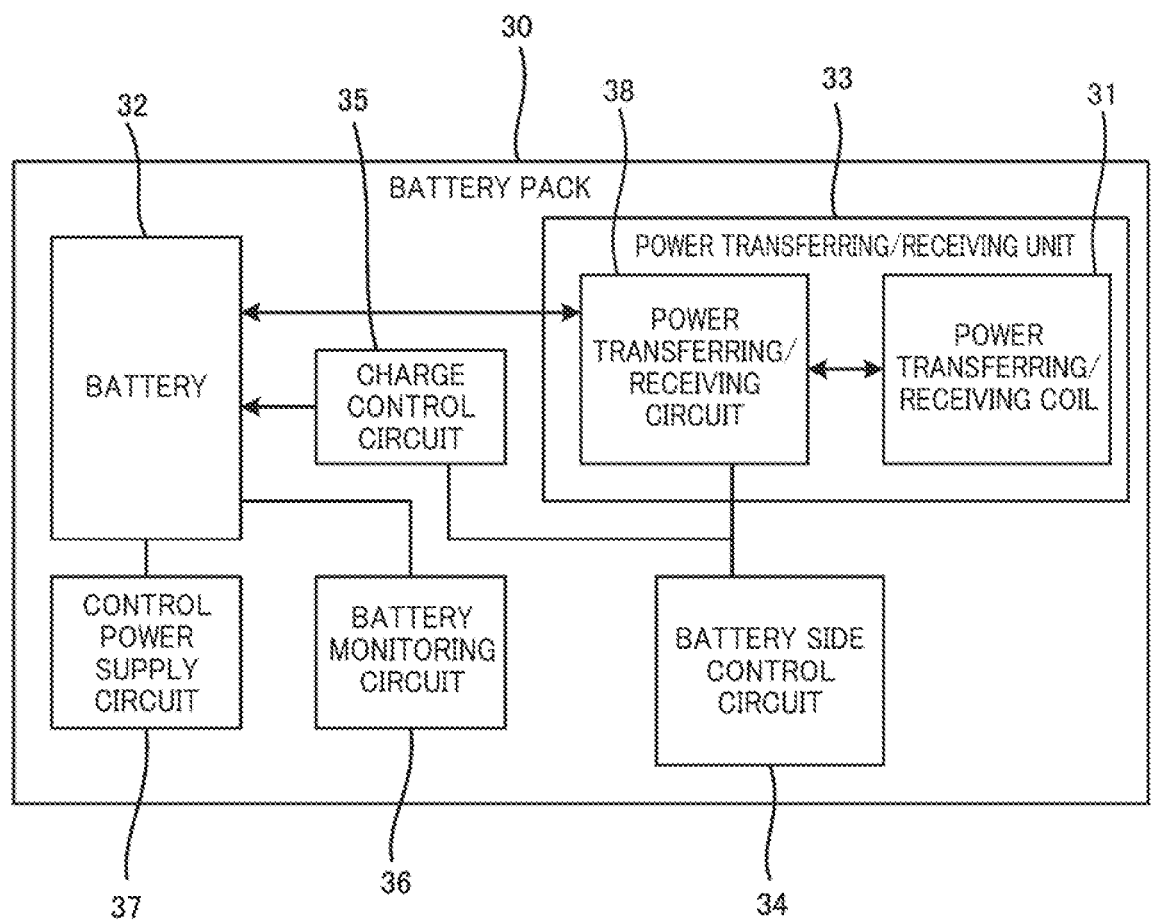
FIG. 2 is a block diagram showing a configuration of the first embodiment.

Next, the battery pack 30 is described in further detail, with reference to FIG. 2.

FIG. 2 is a block diagram showing the configuration of the battery pack 30.

As shown in FIG. 2, the battery pack 30 includes a battery 32 that stores power, a power transferring/receiving unit 33, a battery side control circuit 34 as the control circuit of the present invention, a charge control circuit 35, a battery monitoring circuit 36, and a control power supply circuit 37.

The power transferring/receiving unit 33 includes a power transferring/receiving coil 31 and a power transferring/receiving circuit 38.

The power transferring/receiving coil 31 supplies power when performing wireless power supply with the power receiving coil 22, and, when performing wireless power supply with the power transfer coil 45, receives power in the same manner as the power receiving coil 22 described above.

The power transferring/receiving circuit 38 outputs power from the battery 32 to the power transferring/receiving coil 31 when performing wireless power supply with the power receiving coil 22, and, when performing wireless power supply with the later described power transfer coil 45, receives current from the power transferring/receiving coil 31 in the same manner as the power receiving circuit described above and supplies power to the battery 32 to charge the battery 32.

The battery side control circuit 34 includes a processor such as a CPU or MPU, and a memory unit such as a RAM or ROM. The battery side control circuit 34 functions as a control means for the parts of the battery pack 30 by having the processor execute a program stored in the memory unit.

The battery 32 is, for example, a lithium ion battery, and is composed of a plurality of cells.

The charge control circuit 35 is a circuit for controlling charging of the battery 32 when the power transferring/receiving coil 31 performs wireless power supply from the power transfer coil 45, and performs, for example, CC/CV charge control.

The battery monitoring circuit 36 is a circuit for monitoring the state of the battery 32, such as the voltage, current, and temperature of each cell of the battery 32.

The control power supply circuit 37 is a power supply circuit for controlling each of the circuits of the battery pack 30 described above.

As shown in FIG. 1, an external charger 40 is provided for charging the battery 32 of the electric lawnmower 1.

The external charger 40 includes a power transfer unit 41, a charger side control circuit 42, and a direct current power supply 44 electrically connected to a commercial power supply 43.

The power transfer unit 41 includes a power transfer coil 45 and a power transfer circuit (not shown).

The power transfer coil 45 supplies power to the power transferring/receiving coil 31 of the battery pack 30.

The direct current power supply 44 converts power from the commercial power supply 43 into direct current power for power transfer.

The power transfer circuit is a circuit that outputs power from the direct current power supply 44 to the power transfer coil 45 when performing wireless power supply with the power transferring/receiving coil 31.

The charger side control circuit 42 includes a processor such as a CPU or MPU, and a memory unit such as a RAM or ROM. The charger side control circuit 42 functions as a control means for the parts of the external charger 40 by having the processor execute a program stored in the memory unit.

The electrical characteristics when supplying power to the power receiving coil 22 of the electric lawnmower 1 and the electrical characteristics when power is supplied from the power transfer coil 45 of the external charger 40 differ in terms of characteristics such as impedance or resonance frequency.

Therefore, in the present embodiment, when, for example, the battery pack 30 is first installed in the electric lawnmower 1, the battery side control circuit 34 performs a test power transfer from the power transferring/receiving coil 31 to the power receiving coil 22 of the electric lawnmower 1 and the power transfer coil 45 of the external charger 40 to obtain the electrical characteristics when transferring power to the power receiving coil 22 and the electrical characteristics when transferring power to the power transfer coil 45 in advance, and stores these electrical characteristics in the memory unit.

Then, when the electric lawnmower 1 is used, the battery side control circuit 34 performs a test power transfer from the power transferring/receiving coil 31 to obtain the electrical characteristics of the power receiving side, and the battery side control circuit 34 compares the obtained electrical characteristics to the electrical characteristics stored in the memory unit. The battery side control circuit 34 determines which of the power receiving coil 22 or the power transfer coil 45 the electrical characteristics are, and performs control to switch to the power transfer mode if it has been determined that the electrical characteristics are the electrical characteristics of a power transfer to the power receiving coil 22, or to the power receiving mode if it has been determined that the electrical characteristics are the electrical characteristics of a power transfer to the power transfer coil 45.

The power transferring/receiving coil 31 may have a shape that fits with the power receiving coil 22 of the electric lawnmower 1 or the power transfer coil 45 of the external charger 40. This allows for prevention of mutual displacement.

Next, an operation according to the present embodiment is described with reference to the flowchart shown in FIG. 3.

Figure 3:
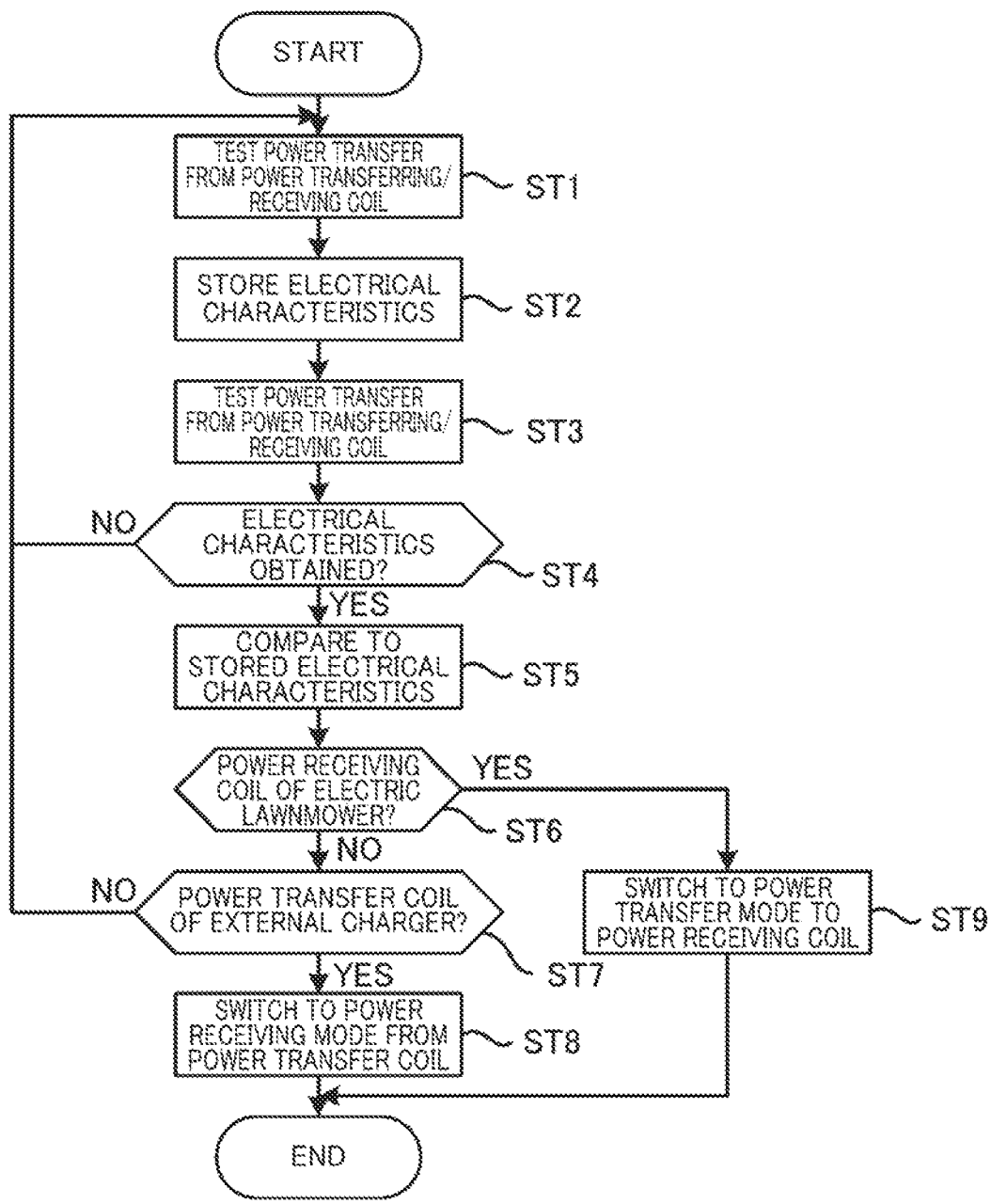
FIG. 3 is a flowchart showing an operation of the first embodiment.

FIG. 3 is a flowchart showing an operation according to the present embodiment.

First, the battery side control circuit 34 performs a test power transfer from the power transferring/receiving coil 31 to the power receiving coil 22 of the electric lawnmower 1 and the power transfer coil 45 of the external charger 40 (ST1).

Then, the battery side control circuit 34 obtains electrical characteristics when power is transferred to the power receiving coil 22 and electrical characteristics when power is transferred to the power transfer coil 45, and stores these electrical characteristics in the memory unit (ST2).

It should be noted that instead of first performing a test power transfer to obtain the electrical characteristics as shown in ST1 and ST2, respective electrical characteristics of the power receiving coil 22 of the electric lawnmower 1 and the power transfer coil 45 of the external charger 40 obtained in advance at a manufacturing stage may be stored in the memory unit. In this case, the initial test power transfer operation is unnecessary.

Next, the battery side control circuit 34 performs a test power transfer from the power transferring/receiving coil 31 (ST3), and in case this test power transfer results in obtaining electrical characteristics of the power receiving side (ST4:YES), the battery side control circuit 34 compares the obtained electrical characteristics to the electrical characteristics stored in the memory unit (ST5).

In case the battery side control circuit 34, by comparing the obtained electrical characteristics to the electrical characteristics stored in the memory unit, determines that the obtained electrical characteristics are the electrical characteristics of a power transfer to the power receiving coil 22 (ST6:YES), the battery side control circuit 34 switches to a power transfer mode in which power is transferred to the power receiving coil 22 (ST9).

In this state, it is possible to perform wireless power supply from the battery 32 of the battery pack 30 to the power receiving coil 22 via the power transferring/receiving coil 31, so that the electric lawnmower 1 can be driven by the power of the battery 32.

On the other hand, in case the battery side control circuit 34 determines that the obtained electrical characteristics are not the electrical characteristics of a power transfer to the power receiving coil 22 (ST6:NO), but determines that the obtained electrical characteristics are the electrical characteristics of a power transfer to the power transfer coil 45 (ST7:YES), the battery side control circuit 34 switches to a power receiving mode in which power is received from the power transfer coil 45 (ST8).

In this state, it is possible to perform wireless power supply of the power of the external charger 40 to the power transferring/receiving coil 31 via the power transfer coil 45, so that the power of the external charger 40 can charge the battery 32 of the battery pack 30.

As mentioned above, the present embodiment includes a battery 32, a power transferring/receiving coil 31, and a battery side control circuit 34 (control circuit) that switches between a power transfer mode in which electrical current of the battery 32 is transferred to the power receiving coil 22 provided to the electric lawnmower 1 (work machine) and a power receiving mode in which the battery 32 is charged with power transferred from the power transfer coil 45 provided to the external charger 40. In addition, the present embodiment includes a memory unit that stores electrical characteristics of the power receiving coil 22 of the electric lawnmower 1 and electrical characteristics of the power transfer coil 45 of the external charger 40, the battery side control circuit 34 performs a test power transfer from the power transferring/receiving coil 31 to the power receiving coil 22 or the power transfer coil 45 to obtain electrical characteristics of the power receiving side, compares the obtained electrical characteristics to the electrical characteristics stored in the memory unit to determine whether the power transfer is to the power receiving coil 22 or to the power transfer coil 45, and performs control to switch to the power transfer mode with respect to the power receiving coil 22 or to the power receiving mode with respect to the power transfer coil 45.

The battery side control circuit 34 thus determines based on the electrical characteristics stored in the memory unit whether the power transfer coil 45 is in a state of wireless power supply with the power receiving coil 22, or in a state of wireless power supply with a transmission coil, allowing for switching between the power receiving mode and the power transfer mode, which makes it possible to wirelessly supply power from the battery pack 30 to the electric lawnmower 1 and to wirelessly supply power from the external charger 40. As a result, there is no need whatsoever for an external terminal of the battery pack 30, which prevents damage, corrosion etc. from occurring in the terminal portion and allows for power supply by the battery pack 30 and charging of the battery pack 30 to be performed smoothly.

Next, a second embodiment of the present invention is described.

Since the configurations of the battery pack 30, electric lawnmower 1, and external charger 40 according to the second embodiment are the same as in the first embodiment, they are described with reference to FIG. 1 and FIG. 2.

In the present embodiment, the control operation differs from that of the first embodiment.

In the present embodiment, the battery side control circuit 34, when an instruction has been received from an input means, performs control in a test mode to determine whether or not power has been supplied from the external charger 40 to the power transferring/receiving coil 31.

The input means may be, for example, a switch operation by a user when mounting the battery pack 30 in the electric lawnmower 1. In this case, the battery side control circuit 34 performs control in the test mode when the switch operation has been carried out.

Further, a construction is employed in which the electric lawnmower 1 is mechanically connected to the external charger 40 when charging the battery pack 30, for example, and the input means is constituted by a switch or sensor, etc. that detects connection of the electric lawnmower 1 to the external charger 40. In this case, the battery side control circuit 34 performs control in the test mode when the electric lawnmower 1 has been connected to the external charger 40.

The test mode of the battery side control circuit 34 is performed by determining whether or not power has been supplied from the power transfer coil 45 of the external charger 40 to the power transferring/receiving coil 31. In case power has been supplied from the power transfer coil 45 of the external charger 40 to the power transferring/receiving coil 31 within a predetermined time period, the battery side control circuit 34 switches to the power receiving mode. On the other hand, if power has not been supplied from the power transfer coil 45 of the external charger 40 to the power transferring/receiving coil 31 within the predetermined time period, the battery side control circuit 34 performs a test power transfer from the power transferring/receiving coil 31, and switches to a transmission mode if the power receiving coil 22 of the electric lawnmower 1 is detected.

Next, an operation of the second embodiment is described with reference to the flowchart shown in FIG. 4.

Figure 4:
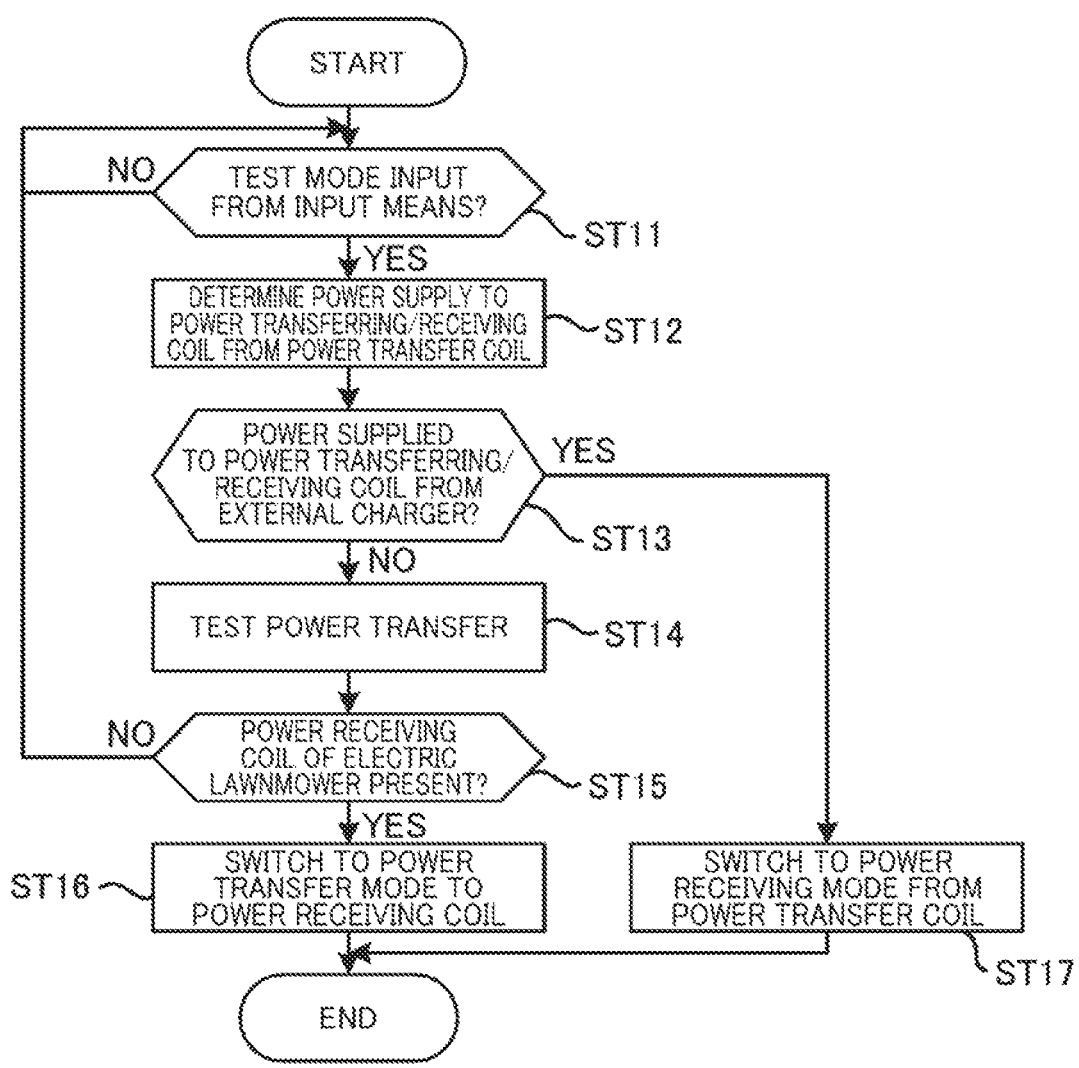
FIG. 4 is a flowchart showing an operation of a second embodiment.

FIG. 4 is a flowchart showing an operation according to the second embodiment.

In the present embodiment, the battery side control circuit 34 first determines whether or not a test mode input has been made from the input means (ST11).

Then, in case it is determined that a test mode input has been made from the input means (ST11:YES), the battery side control circuit 34 determines whether or not power has been supplied from the power transfer coil 45 of the external charger 40 to the power transferring/receiving coil 31 (ST12). In case it is determined that power has been supplied from the power transfer coil 45 of the external charger 40 to the power transferring/receiving coil 31 (ST13:YES), the battery side control circuit 34 performs control to switch to the power receiving mode in which power is received from the power transfer coil 45 (ST17).

On the other hand, in case it is determined that power has not been supplied from the power transfer coil 45 of the external charger 40 to the power transferring/receiving coil 31 (ST13:NO), the battery side control circuit 34 performs a test power transfer from the power transferring/receiving coil 31 (ST14), to determine whether or not the power receiving coil 22 of the electric lawnmower 1 is present (ST15).

In case it has been determined that the power receiving coil 22 of the electric lawnmower 1 is present (ST15:YES), the battery side control circuit 34 performs control to switch to the power transfer mode in which power is transferred to the power receiving coil 22 (ST16).

As mentioned above, in the present embodiment, when an instruction has been received from the input means, the battery side control circuit 34 (control circuit) performs control in a test mode to determine whether or not power has been supplied from the external charger 40 to the power transferring/receiving coil 31. In case power has been supplied from the external charger 40 to the power transferring/receiving coil 31 within a predetermined time period, the battery side control circuit 34 switches to the power receiving mode, and in case power has not been supplied from the external charger 40 to the power transferring/receiving coil 31 within the predetermined time period, the battery side control circuit 34 performs a test power transfer, and, in case it is determined that the power receiving coil 22 is present, switches to a transmission mode.

The battery side control circuit 34 thus performs the test mode based on the instruction from the input means, whereby the battery side control circuit 34 determines whether the power transfer coil 45 is in a state of wireless power supply with the power receiving coil 22, or in a state of wireless power supply with a transmission coil, allowing for switching between the power receiving mode and the power transfer mode, which makes it possible to wirelessly supply power from the battery pack 30 to the electric lawnmower 1 and to wirelessly supply power from the external charger 40. As a result, there is no need whatsoever for an external terminal of the battery pack 30, which prevents damage, corrosion etc. from occurring in the terminal portion and allows for power supply by the battery pack 30 and charging of the battery pack 30 to be performed smoothly.

Next, a third embodiment of the present invention is described.

Figure 5:
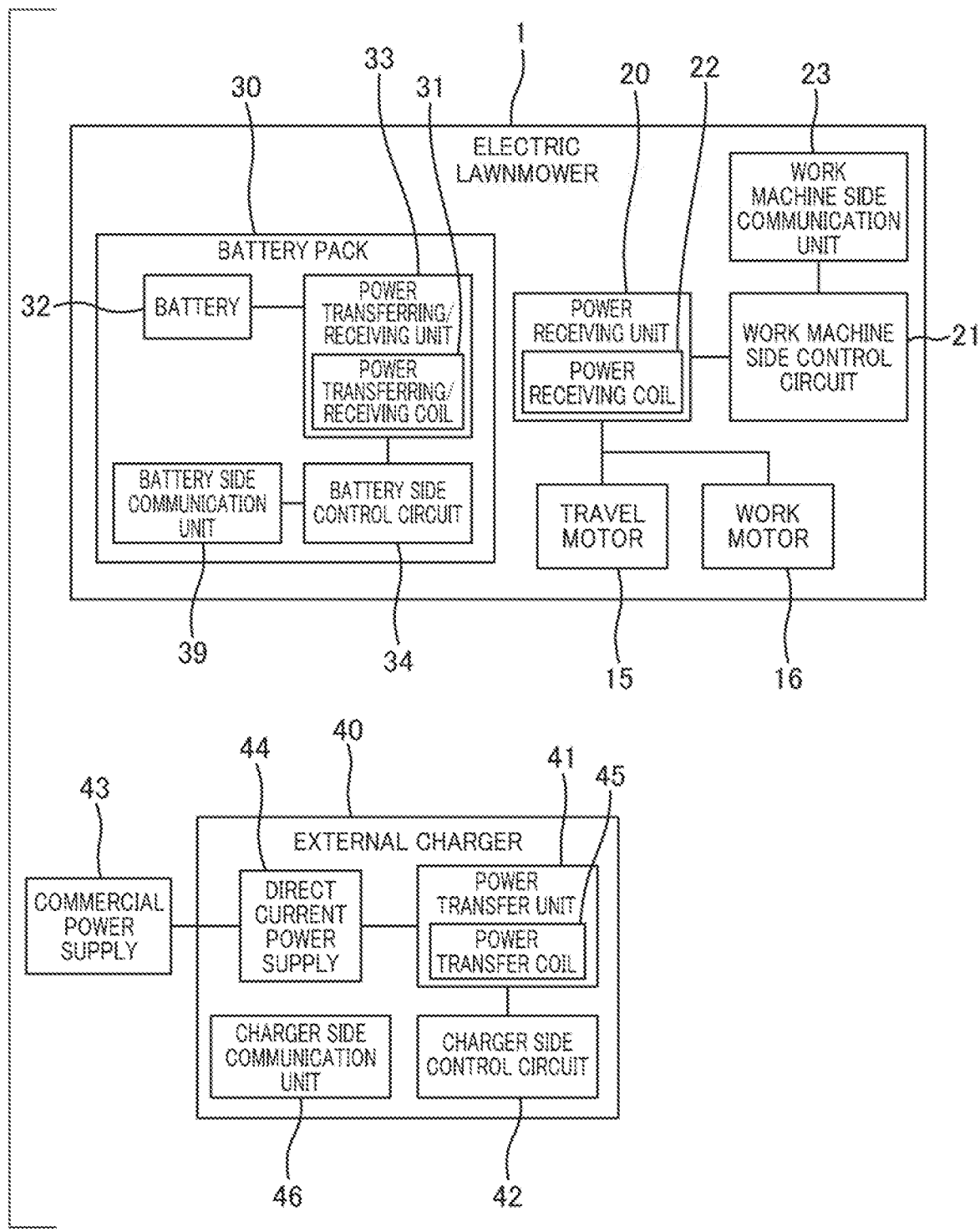
FIG. 5 is a block diagram showing a configuration of a third embodiment.

FIG. 5 is a block diagram showing the third embodiment of the present invention.

As shown in FIG. 5, in the present embodiment, the battery pack 30 is provided with a battery side communication unit 39 (receiver/transmitter).

In addition, the electric lawnmower 1 is provided with a work machine side communication unit 23 (receiver/transmitter) that is communicably connectable to the battery side communication unit 39, and the external charger 40 is provided with a charger side communication unit 46 (receiver/transmitter) that is communicably connectable to the battery side communication unit 39.

The battery side communication unit 39, the work machine side communication unit 23, and the charger side communication unit 46 can communicate using close-range communication such as, for example, Bluetooth®.

The battery side control circuit 34 determines whether or not the battery side communication unit 39 is connected to the work machine side communication unit 23, or whether or not the battery side communication unit 39 is connected to the charger side communication unit 46.

In case the battery side control circuit 34 has determined that the battery side communication unit 39 is connected to the work machine side communication unit 23, the battery side control circuit 34 switches to a power transfer mode in which power is transferred from the power transferring/receiving coil 31 to the power receiving coil 22 of the electric lawnmower 1.

On the other hand, in case the battery side control circuit 34 has determined that the battery side communication unit 39 is connected to the charger side communication unit 46, the battery side control circuit 34 switches to a power receiving mode in which the power transferring/receiving coil 31 receives power from the power transfer coil 45 of the external charger 40.

Next, an operation of the present embodiment is described with reference to the flowchart shown in FIG. 6.

Figure 6:
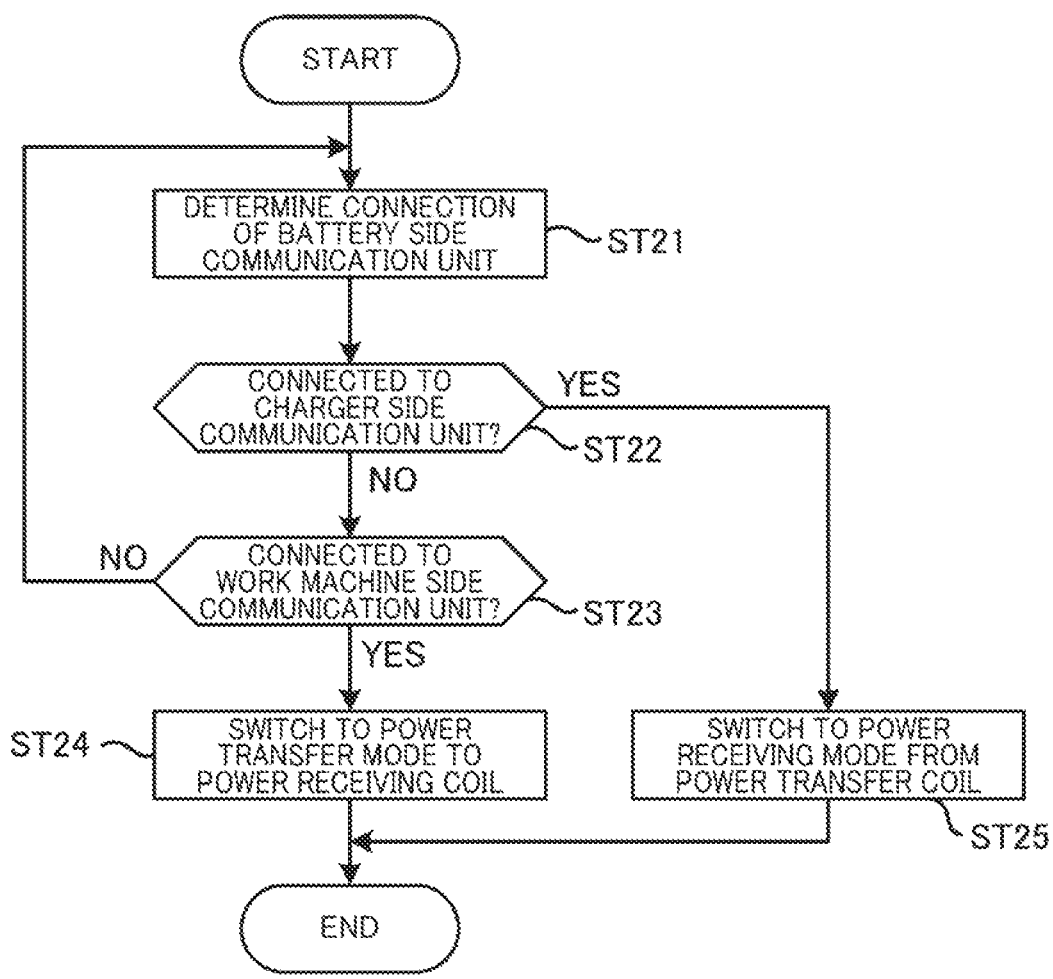
FIG. 6 is a flowchart showing an operation of the third embodiment.

FIG. 6 is a flowchart showing the operation of the third embodiment.

As shown in FIG. 6, the battery side control circuit 34 determines whether or not the battery side communication unit 39 is connected to the work machine side communication unit 23, or whether or not the battery side communication unit 39 is connected to the charger side communication unit 46 (ST21).

In case it has been determined that the battery side communication unit 39 is connected to the charger side communication unit 46 (ST22:YES), the battery side control circuit 34 switches to the power receiving mode in which the power transferring/receiving coil 31 receives power from the power transfer coil 45 of the external charger 40 (ST25).

On the other hand, in case it has been determined that the battery side communication unit 39 is not connected to the charger side communication unit 46 (ST22:NO), but that the battery side communication unit 39 is connected to the work machine side communication unit 23 (ST23:YES), the battery side control circuit 34 switches to the power transfer mode in which power is transferred from the power transferring/receiving coil 31 to the power receiving coil 22 of the electric lawnmower 1 (ST24).

As mentioned above the present embodiment includes a battery side communication unit 39 that is communicably connectable respectively to a work machine side communication unit 23 (communication unit) provided to the electric lawnmower 1 (work machine) and a charger side communication unit 46 (communication unit) provided to the external charger 40, and the battery side control circuit 34 switches to a power receiving mode in case the battery side communication unit 39 is connected to the charger side communication unit 46 of the external charger 40, and switches to a power transfer mode in case the battery side communication unit 39 is connected to the work machine side communication unit 23 of the electric lawnmower 1.

The battery side control circuit 34 (control circuit) thus determines whether the battery side communication unit 39 is connected to the charger side communication unit 46 or to the work machine side communication unit 23, whereby the battery side control circuit 34 determines whether the power transfer coil 45 is in a state of wireless power supply with the power receiving coil 22, or in a state of wireless power supply with a transmission coil, allowing for switching between the power receiving mode and the power transfer mode, which makes it possible to wirelessly supply power from the battery pack 30 to the electric lawnmower 1 and to wirelessly supply power from the external charger 40. As a result, there is no need whatsoever for an external terminal of the battery pack 30, which prevents damage, corrosion etc. from occurring in the terminal portion and allows for power supply by the battery pack 30 and charging of the battery pack 30 to be performed smoothly.

The embodiments described above are merely examples of one aspect of the present invention, and any variations and applications that do not deviate from the spirit or scope of the present invention.

The present invention is not limited to the robotic electric lawnmower 1 described in the embodiments, but may be applied to any work machine in which the battery pack 30 is installed, for example, a walk-behind lawnmower, a snow blower, a tiller, a motor-operated cart, etc.

REFERENCE SIGNS LIST

1 Electric lawnmower
10 Housing
15 Travel motor
16 Work motor
20 Power receiving unit
21 Work machine side control circuit
22 Power receiving coil
23 Work machine side communication unit
30 Battery pack
31 Power transferring/receiving coil
32 Battery
33 Power transferring/receiving unit
34 Battery side control circuit
39 Battery side communication unit
40 External charger
41 Power transfer unit
42 Charger side control circuit
43 Commercial power supply
45 Power transfer coil
46 Charger side communication unit

What is claimed is:

1. An electric lawnmower, comprising:
a travel motor that drives wheels;
a work motor that drives a mowing blade disc that is provided with a mowing blade for mowing grass;
a power receiving coil for extracting power;
a work machine side control circuit that controls the travel motor and the work motor to perform an autonomous travel and a mowing operation of the electric lawnmower, respectively, whereby power extracted by the power receiving coil is supplied to the travel motor and the work motor under control of the work machine side control circuit; and a battery pack that includes a battery and a power transferring/receiving coil, wherein the battery is charged by power supplied, by wireless power supply, from an external charger, and the power transferring/receiving coil is magnetically coupled with the power receiving coil and wirelessly supplies power of the battery to the power receiving coil, and wherein the travel motor, the work motor, the power receiving coil, the work machine side control circuit, and the battery pack are housed within a housing.

2. The electric lawnmower according to claim 1, further comprising:

a memory that stores predetermined electrical characteristics of the power receiving coil and the power transfer coil of the external charger, wherein the battery side control circuit performs a test power transfer from the power transferring/receiving coil to the power receiving coil or the power transfer coil to obtain electrical characteristics of a power receiving side, compares the obtained electrical characteristics to the predetermined electrical characteristics that are stored in the memory to determine whether the obtained electrical characteristics are indicative of a power transfer to the power receiving coil or of a power transfer to the power transfer coil, and performs control to switch to the power transfer mode with respect to the power receiving coil if the obtained electrical characteristics are indicative of power transfer to the power receiving coil or to the power receiving mode with respect to the power transfer coil if the obtained electrical characteristics are indicative of power transfer to the power transfer coil.

3. The electric lawnmower according to claim 1, wherein the battery side control circuit, when an instruction has been received from a switch or a sensor, performs control in a test mode to determine whether or not power has been supplied from the external charger to the power transferring/receiving coil, and wherein in case power has been supplied from the external charger to the power transferring/receiving coil within a predetermined time period, the battery side control circuit switches to the power receiving mode, and in case power has not been supplied from the external charger within the predetermined time period, the control circuit performs a test power transfer, and switches to a transmission mode if the power receiving coil is determined to be present.

4. The electric lawnmower according to claim 1, wherein the battery pack comprises a battery side communication unit having a receiver and a transmitter that is communicably connectable respectively to a work machine side communication unit having a receiver and a transmitter connected to the work machine side control circuit and a charger side communication unit having a receiver and a transmitter connected to the external charger, wherein the battery side control circuit switches to the power receiving mode in case the battery side communication unit is connected to the charger side communication unit of the external charger, and switches to the power transfer mode in case the battery side communication unit is connected to the work machine side communication unit.

5. The electric lawnmower according to claim 3, wherein the electric lawnmower has a construction of connecting mechanically to the external charger, and wherein the switch or sensor performs an input operation when the electric lawnmower is connected to the external charger.

6. The electric lawnmower according to claim 1, wherein the power transferring/receiving coil has a shape that fits with the power receiving coil or the power transfer coil.

7. The electric lawnmower according to claim 1, wherein the battery pack is secured to the housinq at a predetermined position by a screw.

8. The electric lawnmower according to claim 1, wherein the battery pack comprises a battery side control circuit that performs test power transfer from the power transferring/receiving coil to the power transfer coil of the external charger and the charging coil to obtain electrical characteristics of the power receiving coil and the power transfer coil, and based on the obtained electrical characteristics, the battery side control circuit switches between a power transfer mode in which current of the battery is transferred to the power receiving coil, and a power receiving mode in which power transferred from the power transfer coil provided to the external charger charges the battery.

* * * * *